(12) United States Patent
Katsuragawa

(10) Patent No.: US 6,657,271 B2
(45) Date of Patent: Dec. 2, 2003

(54) TRANSPARENT SUBSTRATE WITH MULTILAYER ANTIREFLECTION FILM HAVING ELECTRICAL CONDUCTIVITY

(75) Inventor: Jun Katsuragawa, Okazaki (JP)

(73) Assignee: Nidek Company, Limited, Gamagori (JP)

( * ) Notice: Subject to any disclaimer, the term of this patent is extended or adjusted under 35 U.S.C. 154(b) by 21 days.

(21) Appl. No.: 10/128,436

(22) Filed: Apr. 24, 2002

(65) Prior Publication Data

US 2002/0197824 A1 Dec. 26, 2002

(30) Foreign Application Priority Data

May 1, 2001 (JP) .......................................... 2001-134416

(51) Int. Cl.⁷ ........................................... H01L 31/0232
(52) U.S. Cl. ....................................................... 257/437
(58) Field of Search ................................. 257/431, 436, 257/437; 438/48, 54, 72, 636; 428/212

(56) References Cited

U.S. PATENT DOCUMENTS

| | | | |
|---|---|---|---|
| 4,581,280 A | * 4/1986 | Taguchi et al. | 428/212 |
| 4,794,033 A | * 12/1988 | Ooi | 428/212 |
| 5,693,958 A | * 12/1997 | Torihara et al. | 257/59 |
| 6,337,771 B1 | 1/2002 | Chu et al. | 359/586 |
| 6,352,761 B1 | * 3/2002 | Hebrink et al. | 428/212 |

FOREIGN PATENT DOCUMENTS

| | | |
|---|---|---|
| EP | 1 001 280 A1 | 5/2000 |
| JP | A 01 100257 | 4/1989 |
| JP | A 02 239201 | 9/1990 |
| JP | 7-77507 | * 3/1994 |
| JP | A 6-316442 | 11/1994 |
| JP | A 11-84364 | 3/1999 |
| JP | A 11-249812 | 9/1999 |
| JP | A 11-271737 | 10/1999 |
| JP | A 2000-207128 | 7/2000 |

* cited by examiner

Primary Examiner—Tom Thomas
Assistant Examiner—Hung Kim Vu
(74) Attorney, Agent, or Firm—Oliff & Berridge, PLC

(57) ABSTRACT

A transparent substrate with a multilayer antireflection film having electrical conductivity is disclosed. On a polycarbonate substrate (a refractive index of 1.58) with a hard coat, a first thin-film layer whose main component is $SiO_2$ is formed with a thickness of 142.5 nm (approx. $\lambda/4$ for a wavelength of 550 nm). A second thin-film layer whose main component is $TiO_2$ is formed with a thickness of 124.0 nm on the first thin-film layer. Furthermore, a third thin-film layer whose main component is indium tin oxide (ITO) is formed with a thickness of 150.0 nm on the second thin-film layer.

20 Claims, 5 Drawing Sheets

TRANSPARENT SUBSTRATE WITH MULTILAYER ANTIREFLECTION FILM HAVING ELECTRICAL CONDUCTIVITY

BACKGROUND OF THE INVENTION

1. Field of the Invention

The present invention relates to a transparent substrate with a multilayer antireflection film having electrical conductivity, achieving high transmittance.

2. Description of Related Art

Heretofore, there have been known transparent substrates such as glass plates coated with a transparent electrically conductive film such as indium tin oxide (ITO), $SnO_2$, or the like. These would be used for electrodes of photoelectric sensing elements such as a solar cell and electrodes of liquid crystal and other display devices or touch panels. In particular, the substrate to be used in the touch panels or the liquid crystal displays needs to have high transmittance with respect to the light of a visible wavelength region and optimum resistance. For manufacture of liquid crystal displays, furthermore, a transparent electrically conductive film having a low resistance of $100\Omega/\square$ (ohm per square) or less, more preferably, $50\Omega/\square$ or less is desired to allow sharp display of moving images.

For small-sized liquid crystal displays for use in cellular phones and the like, instead of the glass substrate, a plastic substrate is being put to use with a high frequency and with a multilayer film formed thereon. This is because the plastic substrate is lighter and less fragile than the glass substrate.

To form the transparent electrically conductive film with a lower resistance value, in general, the film thickness of the conductive film has to be more increased. However, as the thickness of the conductive film increases, the transmittance still further lowers, which makes it difficult to achieve high transmittance.

When the same film as the multilayer film formed on the glass substrate is formed on the plastic substrate, the resistance value of the electrically conductive film becomes higher and the transmittance becomes lower as compared with in the glass substrate. This results from that the transmittance of plastic itself is lower than that of glass and also that the film formation on the plastic substrate can not be executed under a high temperature (about 300° C.) such as used in the film formation on the glass substrate to prevent melting of the plastic substrate.

SUMMARY OF THE INVENTION

The present invention has been made in view of the above circumstances and has an object to overcome the above problems and to provide a transparent substrate with a multilayer antireflection film having electrical conductivity, the film being capable of achieving high transmittance while having low resistance even if a plastic substrate is used.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a transparent substrate with a multilayer antireflection film having electrical conductivity, the film including a transparent dielectric thin-film and a transparent conductive thin-film layered on the transparent substrate, wherein the transparent dielectric thin-film consists of a first thin-film layer having a lower refractive index than a refractive index of the transparent substrate and a second thin-film layer having a higher refractive index than the refractive index of the first thin-layer, and the transparent conductive thin-film consists of a third thin-film layer, the first, second, and third thin-film layers being formed on the transparent substrate in this order from the transparent substrate side so that the third thin-film layer is an outermost layer, and an optical thickness of the third thin-film layer is determined to provide a desired surface resistance value, and optical thickness of the second thin-film layer is determined so that the sum total of the optical thickness of the second thin-film layer and the optical thickness of the third thin-film layer is approximate $\lambda/2$.

In another embodiment of the invention, there is provided a transparent substrate with a multilayer antireflection film having electrical conductivity, the film including a transparent dielectric thin-film and a transparent conductive thin-film layered on the transparent substrate, wherein the transparent dielectric thin-film consists of a first thin-film layer having a lower refractive index than a refractive index of the transparent substrate and a second thin-film layer having a higher refractive index than the refractive index of the first thin-layer, and the transparent conductive thin-film consists of a third thin-film layer having a higher refractive index than the refractive index of the transparent substrate, the first, second, and third thin-film layers being formed on the transparent substrate in this order from the transparent substrate side so that the third thin-film layer is an outermost layer, and an optical thickness of the third thin-film layer is determined to provide a desired surface resistance value, and optical thickness of the second thin-film layer is determined so that the sum total of the optical thickness of the second thin-film layer and the optical thickness of the third thin-film layer is approximate $\lambda/2$.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
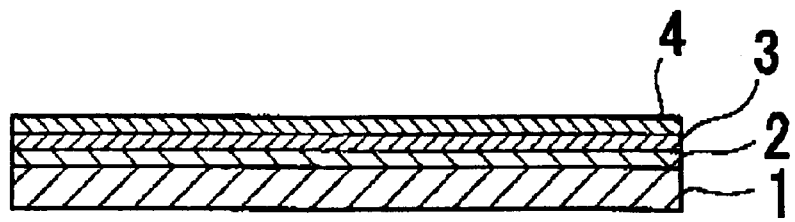
FIG. 1 is a schematic view of a film configuration in an embodiment according to the present invention.

A detailed description of a preferred embodiment of a transparent substrate with a multilayer antireflection film having electrical conductivity embodying the present invention will now be given referring to the accompanying drawings. FIG. 1 is a schematic view of a layer configuration of the multilayer antireflection film in the present embodiment.

The transparent substrate with a multilayer antireflection film in the present embodiment is constructed of a substrate 1, a first thin-film layer 2, a second thin-film layer 3, and a third thin-film layer 4. These first, second, and third layers 2, 3, and 4 are formed in layers in this order from the substrate 1 side, thereby constituting the multilayer antireflection film. This transparent substrate is mainly used in liquid crystal displays. The substrate 1, which is a base of the transparent substrate with the multilayer antireflection film, is a plastic substrate such as polycarbonate, polyethylene terephthalate, or the like. Not limited to plastic, the material constituting the substrate 1 may be selected from among materials which are optically transparent such as glass and of refractive indices of about 1.48 to about 1.70.

The first thin-film layer 2 layered on the substrate 1 is a transparent dielectric material having a lower refractive index than that of the substrate 1. The transparent dielectric material to be used for this first layer 2 is appropriately selected from among materials having refractive indices of about 1.35 to about 1.60 according to the material of the substrate 1. More specifically, the main component of the first layer 2 is, for instance, $SiO_2$ (a refractive index of 1.46) or $MgF_2$. The first layer 2 is formed having the optical film thickness (hereinafter simply referred to as "thickness") of approximate $\lambda/4$ in order to facilitate thickness control.

In addition, an undercoat layer may be provided between the substrate 1 and the first thin-film layer 2 to enhance the adhesion between the substrate 1 and the multilayer film formed thereon. As this undercoat layer, a hard coat is generally used because it is capable of protecting the surface of the substrate 1 while increasing the adhesion between the substrate 1 and the multilayer film. The thickness of the undercoat layer is preferably determined so as to cause no optical inhibition.

The second thin-film layer 3 layered on the first layer 2 is a transparent dielectric material having a higher refractive index than that of the first layer 2. This second layer 3 is desired to have a refractive index higher than that of the substrate 1 and equal to that of the third thin-film layer 4 mentioned later in detail. Accordingly, the transparent dielectric material to be used for this second layer 3 is appropriately selected from among materials having refractive indices of about 1.58 (or 1.50 in the case of the substrate 1 being made of glass) to about 2.50. More specifically, the main component of the second layer 3 is, for instance, $TiO_2$ (a refractive index of 2.20), $ZrO_2$ (a refractive index of 1.90), or $Al_2O_3$ (a refractive index of 1.6). The thickness of the second layer 3 is determined so that the sum total of thickness of the second layer 3 and that of a thin-film layer to be arranged on the layer 3 (namely, the third layer 4 in the present embodiment) is approximate $\lambda/2$.

The third thin-film layer 4 is a thin-film layer having electrical conductivity, which is layered on the second layer 3 to configure an outermost layer. The main component of the third layer 4 is, for instance, ITO or $SnO_2$. A surface resistance value of the third layer 4 varies depending on the thickness thereof. Thus, the thickness of the third layer 4 may be made larger in order to reduce a surface resistance value or smaller in order to increase the surface resistance value. When a desired value of the surface resistance of the third layer 4 is determined, the thickness of the third layer 4 is logically determined.

In the present embodiment, for use in a liquid crystal display, the desired surface resistance value is determined in a range of $10\Omega/\square$ to $100\Omega/\square$, more preferably, $10\Omega/\square$ to $50\Omega/\square$. Accordingly, the thickness of third thin-film layer 4 is determined in a range of 80 nm to 200 nm in correspondence with the desired surface resistance value. Setting the surface resistance value of the third layer 4 to a lower value in this way intends to increase a reaction rate of liquid crystals, thereby to allow sharper display of moving images on the liquid crystal display.

In the present specification, as mentioned later, evaluations of the transparent substrate with the multilayer antireflection film are provided using a Y value.

The Y value is a value obtained by integration of the product of a spectral reflectivity of a test sample measured using a spectrophotometer and a color-matching function $y(\lambda)$ of an XYZ color system for the visible wavelength region.

A stimulus value Y (Y value) is considered as an index for an evaluation of lightness. When the Y value is used as luminous reflectivity, therefore, a higher Y value indicates that the tested substrate has a higher reflectivity and, to the contrary, a lower Y value indicates that the tested substrate has a higher transmittance.

In the present specification, the evaluations are made using this Y value representing the luminous reflectivity. Specifically, the Y value in the present specification is calculated by measurement of the reflectivity. This shows that the lower the Y value, the lower the reflectivity, namely, the higher the transmittance. Currently, research and development aimed at reducing this Y value in "0.1" steps are briskly conducted. In this situation, actually, those skilled in the art considers that a reduction of "0.1" in the Y value is an excellent result.

To reduce the Y value as the luminous reflectivity, it is necessary to minimize reflectivity with respect to the light having a wavelength of 550 nm. It is known that the minimum reflectivity shifts as the thickness of a conductive thin film layer formed as the outermost layer (the third thin-film layer 4 in the present embodiment) is changed. More specifically, the minimum reflectivity shifts to a short wavelength side when the thickness of the conductive thin film layer is made smaller or to a long wavelength side when the thickness of the conductive thin film layer is made larger.

Figure 2:
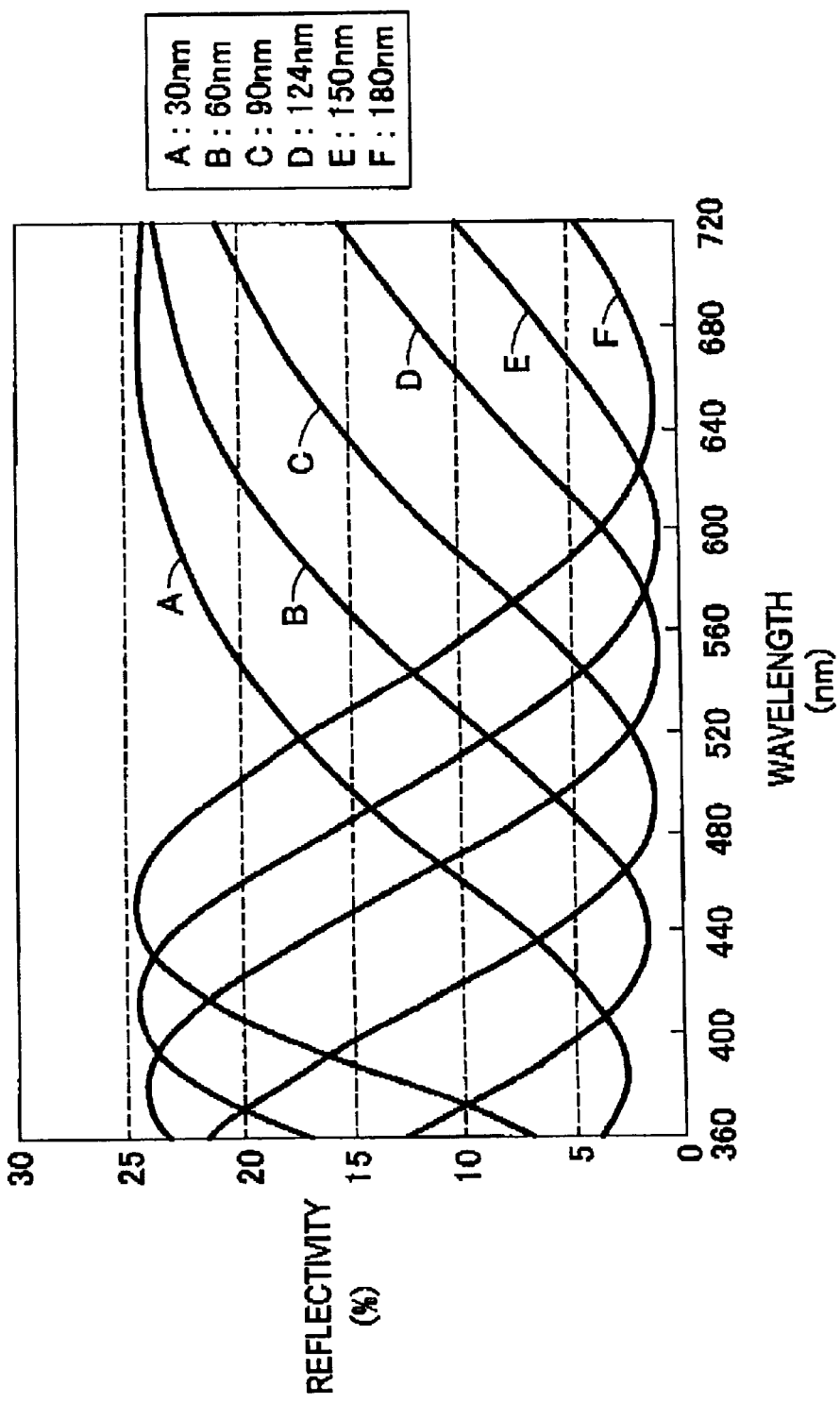
FIG. 2 is a graph showing simulation results of reflectivity of the film configurations each including a third thin-film layer with constant thickness and a second thin-film layer with different thickness.

However, the surface resistance of the third thin-film layer 4 needs to be constant at a desired value. It is therefore impossible to change the thickness of the third layer 4. Hence the inventors of the present invention found, after much trial and error, that the minimum reflectivity shifted when the thickness of the second thin-film layer 3, instead of the third layer 4, was changed if the second layer 3 was formed with the refractive index equal to that of the third layer 4. This simulation result is shown in FIG. 2. In this simulation, the second layer 3 was formed as a $TiO_2$ film and the third layer 4 was formed as an ITO film having an unchanged thickness of 150 nm (a surface resistance of 30 $\Omega/\square$), and the thickness of the second layer 3 was variously changed.

It is apparent from FIG. 2 that the minimum reflectivity shifted as the thickness of the $TiO_2$ film was changed. More specifically, the minimum reflectivity shifted to the long wavelength side as the thickness of the $TiO_2$ film increased. It was seen that, for the thickness of the $TiO_2$ film being 124 nm, namely, the sum of thickness of the $TiO_2$ film and that of the ITO film being 274 nm, the reflectivity became minimum with respect to the light having a wavelength of 550 nm. The thickness of the second thin-film layer 3 is, as mentioned above, designed to provide a thickness of approx. λ/2 in total with the third thin-film layer 4 formed on the second layer 3, so that the reflectivity becomes minimum with respect to the wavelength of 550 nm, making it possible to reduce the Y value. Namely, high transmittance can be achieved.

In the methods of forming the above mentioned thin-film layers 2 to 4 on the transparent substrate 1, physical methods include thermal deposition, spattering, ion plating, or the like, and chemical methods include plating, chemical vapor deposition, or the like. All these film forming methods are usable as preferred embodiments of the present invention. In particular, vacuum deposition which is one of the thermal deposition and the spattering are preferably used because those methods allow execution of accurate thickness control.

It is to be noted that the preferred embodiments are only examples and the present invention may be embodied in other specific forms without departing from the spirit or essential characteristics thereof.

Concrete examples of the transparent substrate with the multilayer antireflective electrically-conductive film having the above structure are specifically explained below.

Preferred Example 1

A polycarbonate substrate with a hard coat was prepared (a refractive index of 1.58). This substrate was cleaned by an ultrasonic cleaner to remove soil from the substrate surface. The substrate was dried and put in a vacuum deposition apparatus which was then subjected to air exhaust. From start of the air exhaust until leakage after the completion of film formation on the substrate, a micro-heater and a halogen heater in the apparatus were operated to heat the substrate at 130° C. In the apparatus, furthermore, chemicals to be used for film formation of the first, second, and third layers have been arranged in advance.

After about 1 hour from the start of heating, the film formation was started. At first, the chemical ($SiO_2$ granules) for deposition of the first layer, previously put in the apparatus, was used to form a thin-film layer whose main component was $SiO_2$ on the substrate. A deposition time was set to about 5 minutes and a film thickness was 142.5 nm (corresponding to a thickness of approx. λ/4 with respect to a 550 nm wavelength).

Secondly, the chemical ($TiO_2$ tablets, by OPTRON Inc.) for deposition of the second layer was used to form a thin-film layer whose main component was $TiO_2$ on top of the first thin-film layer. A deposition time was set to about 5 minutes and a film thickness was 124.0 nm.

Subsequently, the chemical (ITO tablets, by OPTRON Inc.) for deposition of the third layer was used to form a thin-film layer whose main component was ITO on top of the second thin-film layer. For the duration of this formation of the third layer, a plasma treatment (RF treatment) was performed. A thickness thereof was 150.0 nm which produces a surface resistance of 30Ω/□.

Figure 3:
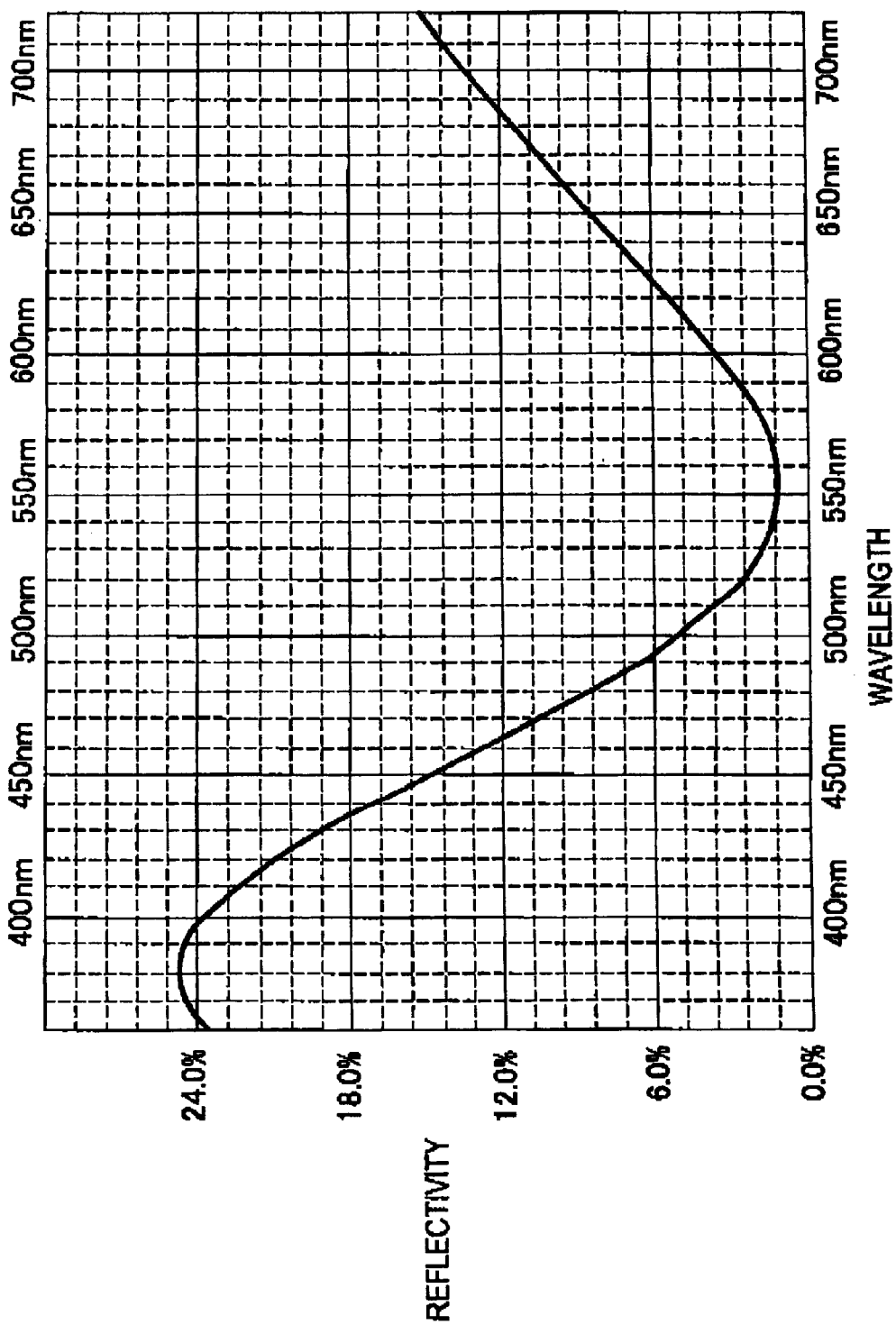
FIG. 3 is a graph showing a simulation result of transmittance and reflectivity of a film configuration and film thickness in a first preferred example.

The thus produced multilayer antireflection film having electrical conductivity was slow-cooled to be used as a test sample. Visible light transmission of this sample was measured using a spectrophotometer. The luminous transmittance of this sample was 91%. FIG. 3 shows a simulation result of transmittance and reflectivity provided by this film configuration and film thickness The simulation result shows the transmittance of 98.9% and the reflectivity of 1.0% with respect to the light having a 550 nm wavelength.

Comparative Example 1

Figure 4:
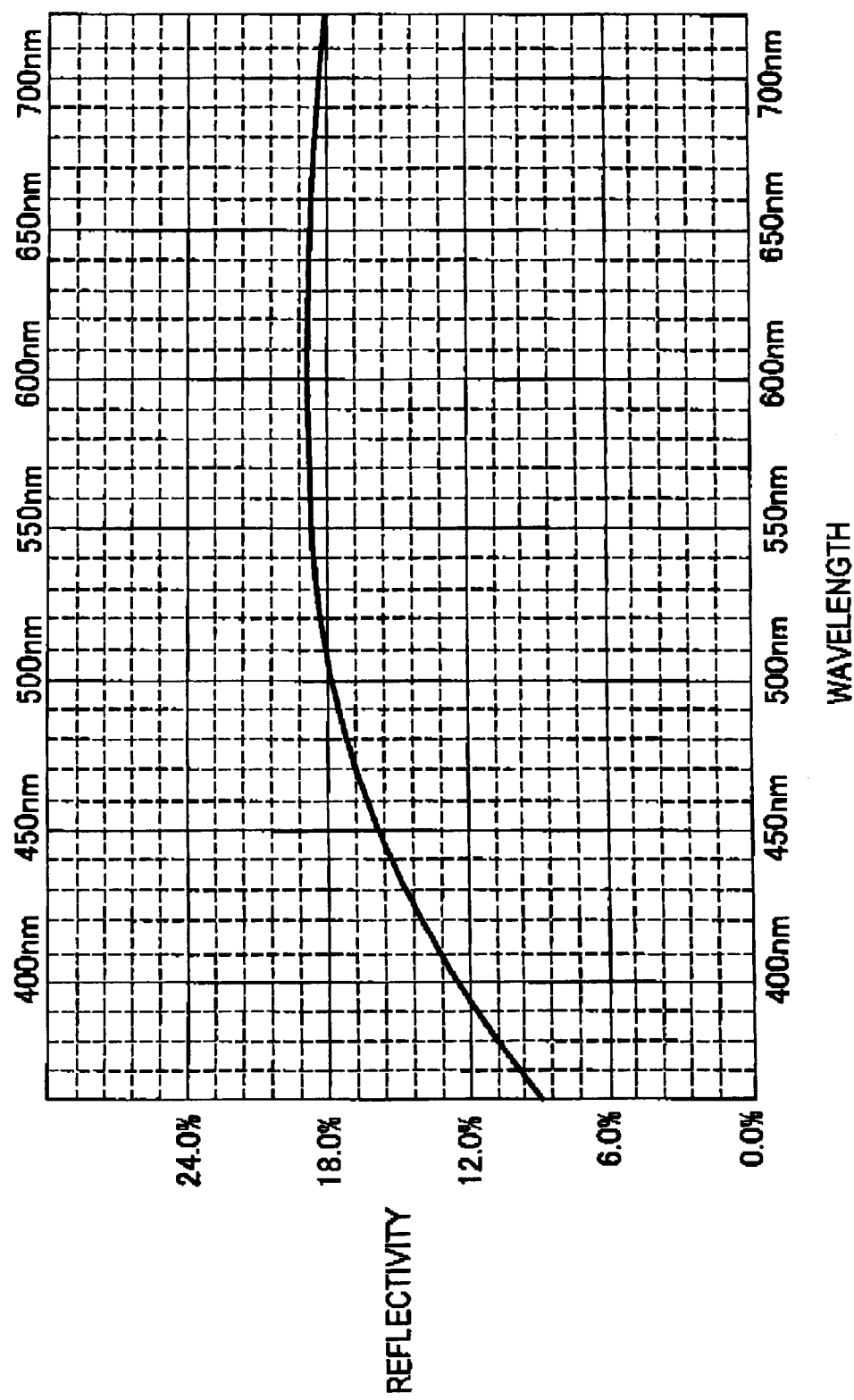
FIG. 4 is a graph showing a simulation result of transmittance and reflectivity of a film configuration and film thickness in a first comparative example.

An identical substrate (polycarbonate, a refractive index of 1.58) to that in the Preferred Example 1 was used, on which an ITO thin-film layer (a refractive index of 2.0) was formed having a thickness of 150.0 nm. This was subjected to the same simulation for the preferred example 1. This simulation result is shown in FIG. 4. It is apparent that the transmittance was 81.4% and the reflectivity was 18.5% with respect to the light having a 550 nm wavelength.

Comparative Example 2

Figure 5:
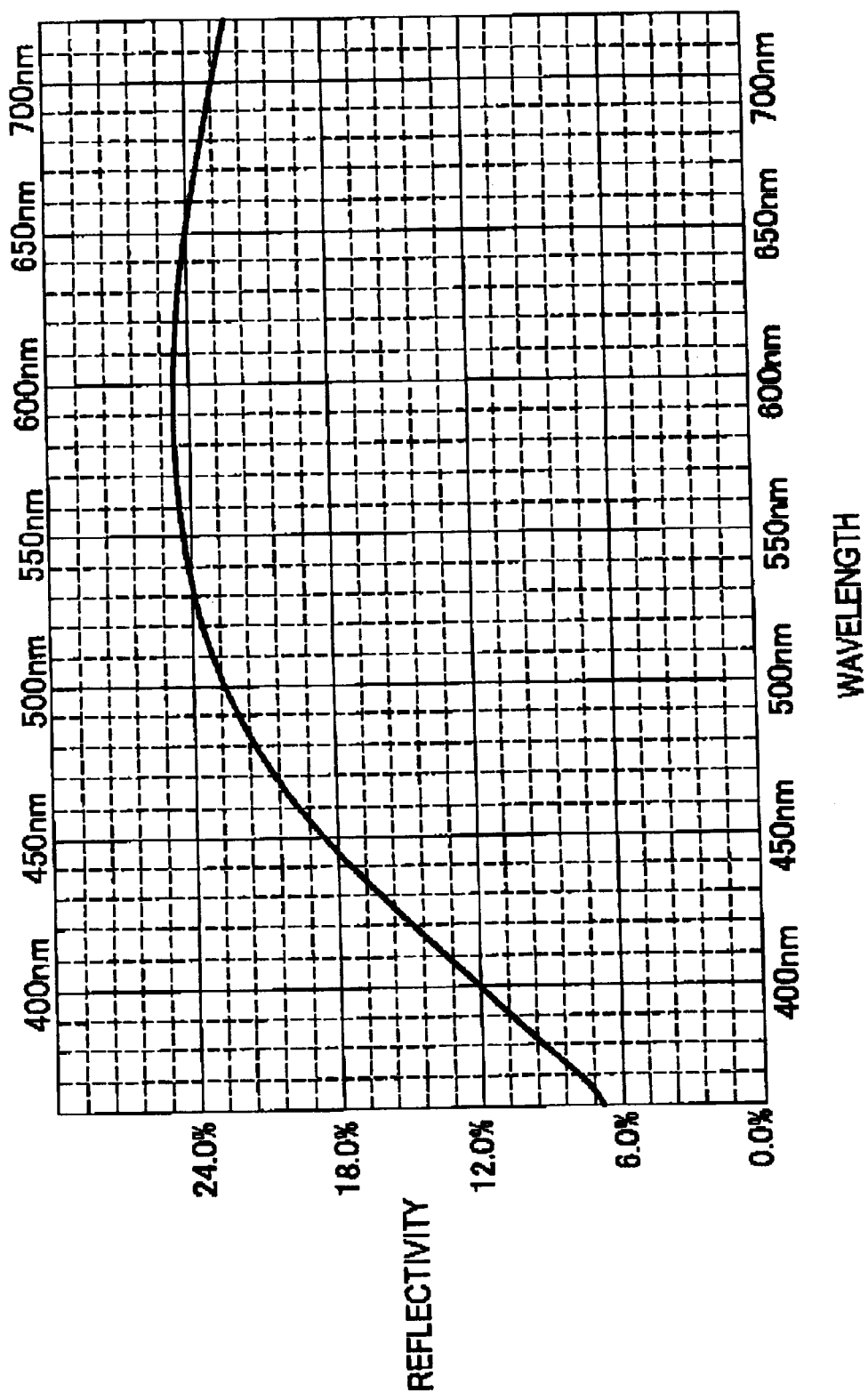
FIG. 5 is a graph showing a simulation result of transmittance and reflectivity of a film configuration and film thickness in a second comparative example.

An identical substrate (polycarbonate, a refractive index of 1.58) to that in the Preferred Example 1 was used. An antireflection film of a $SiO_2$ single layer (a refractive index of 1.46) with a film thickness of 138 nm equal to approx. ¼λ was formed, and an ITO thin-film layer (a refractive index of 2.0) was formed having a film thickness of 150.0 nm on top of the antireflection film. This was also subjected to the same simulation as in the Preferred Example 1. This simulation result is shown in FIG. 5. It is seen that the transmittance was 75.7% and the reflectivity was 24.2% with respect to the light of a 550 nm wavelength.

Comparative Example 3

The film configuration in the embodiment was used with the electrically conductive film being variously changed in thickness. Each thickness and a corresponding Y value are shown in Table 1. In this film configuration, basically, the first thin-film layer has a thickness of λ/4, and the second and third thin-film layers have a thickness of λ/2 in total. Each thickness was slightly revised to achieve a minimum Y value. In other words, since the lower Y value indicates the higher transmittance as mentioned above, each thickness was revised by a slight amount to achieve maximum transmittance.

TABLE 1

| THICKNESS OF ITO | $1^{ST}$ LAYER ($SiO_2$) | $2^{ND}$ LAYER ($TiO_2$) | $3^{RD}$ LAYER (ITO) | Y VALUE |
|---|---|---|---|---|
| 50 nm | 139.5 nm | 229 nm | 50 nm | 4.1709 |
| 100 nm | 139.5 nm | 179 nm | 100 nm | 3.3784 |
| 110 nm | 141.5 nm | 168 nm | 110 nm | 3.2744 |
| 115 nm | 139.5 nm | 163 nm | 115 nm | 3.2342 |
| 120 nm | 142.5 nm | 157 nm | 120 nm | 3.2017 |
| 137.5 nm | 141.5 nm | 138 nm | 137.5 nm | 3.1526 |
| 150 nm | 142.5 nm | 124 nm | 150 nm | 3.1783 |

Furthermore, the film configuration (the substrate+$SiO_2$+ITO) in the comparative example 2was used with the electrically conductive film being variously changed in thickness. Each thickness and a corresponding Y value are shown in Table 2. In this case, the thickness of $SiO_2$ was determined to achieve a minimum Y value. In other words, since the lower Y value indicates the higher transmittance as mentioned above, the thickness of $SiO_2$ was determined to achieve maximum transmittance.

TABLE 2

| THICKNESS OF ITO | $1^{ST}$ LAYER ($SiO_2$) | $2^{ND}$ LAYER (ITO) | Y VALUE |
|---|---|---|---|
| 50 nm | 61.5 nm | 50 nm | 8.8032 |
| 100 nm | 23.0 nm | 100 nm | 19.2125 |
| 110 nm | 17.0 nm | 110 nm | 20.5349 |
| 115 nm | 14.0 nm | 115 nm | 21.0535 |
| 120 nm | 11.0 nm | 120 nm | 21.4745 |
| 137.5 nm | 0 nm | 137.5 nm | 22.1261 |
| 150 nm | 0 nm | 150 nm | 21.8528 |

Using the identical substrate to that in the preferred example 1, a thin-film layer (TiO$_2$) with a high refractive index and a thin-film layer (SiO$_2$) with a low refractive index were formed in order on the substrate. An electrically conductive layer was further formed as an outermost layer. With this film configuration, the conductive layers were changed variously in thickness. Each thickness and a corresponding Y value are shown in Table 3. In this case, each thickness was determined to obtain a minimum Y value. In other words, since the lower Y value indicates the higher transmittance as mentioned above, each thickness of the thin-film layers was determined to achieve maximum transmittance.

TABLE 3

| THICKNESS OF ITO | 1$^{ST}$ LAYER (TiO$_2$) | 2$^{ND}$ LAYER (SiO$_2$) | 3$^{RD}$ LAYER (ITO) | Y VALUE |
| --- | --- | --- | --- | --- |
| 50 nm | 91 nm | 84.5 nm | 50 nm | 0.9909 |
| 100 nm | 137 nm | 24.5 nm | 100 nm | 2.6461 |
| 110 nm | 138 nm | 17.5 nm | 110 nm | 3.0545 |
| 115 nm | 138 nm | 14.5 nm | 115 nm | 3.2254 |
| 120 nm | 139 nm | 10.5 nm | 120 nm | 3.3675 |
| 137.5 nm | 137 nm | 0.5 nm | 137.5 nm | 3.5921 |
| 150 nm | 124 nm | 0.5 nm | 150 nm | 3.6391 |

As shown in Table 3, the Y values are relatively low if the thickness of the ITO layer is small. However, when the surface resistance of the ITO layer is approx. 50Ω/□ or less (a thickness of 120 nm or more), the Y values are apt to increase.

According to the film configuration in the present embodiment shown in Table 1, on the other hand, as compared with the film configuration shown in Table 3, every Y values were reduced by "0.1" or more when the thickness of the ITO layer was 120 nm or more (a surface resistance of approx. 50Ω/□ or less). The film configuration shown in Table 1 could achieve Y values each lower than those obtained by the conventionally generally used film configuration shown in Table 2.

According to the film configuration in the above embodiment shown in Table 1, even if a plastic substrate is used, the transparent substrate with the multilayer antireflection conductive film capable of achieving high transmittance though it is a transparent electrically conductive film with a low resistance value. As a matter of course, the same effect as in the above case can be obtained even if a glass substrate is used instead of the plastic substrate.

What is claimed is:

1. A transparent substrate with a multilayer antireflection film having electrical conductivity, the film including a transparent dielectric thin-film and a transparent conductive thin-film layered on the transparent substrate, wherein the transparent dielectric thin-film consists of a first thin-film layer having a lower refractive index than a refractive index of the transparent substrate and a second thin-film layer having a higher refractive index than the refractive index of the first thin-layer, and the transparent conductive thin-film consists of a third thin-film layer, the first, second, and third thin-film layers being formed on the transparent substrate in this order from the transparent substrate side so that the third thin-film layer is an outermost layer, and an optical thickness of the third thin-film layer is determined to provide a desired surface resistance value, and optical thickness of the second thin-film layer is determined so that the sum total of the optical thickness of the second thin-film layer and the optical thickness of the third thin-film layer is approximate λ/2.

2. The transparent substrate with a multilayer antireflection film having electrical conductivity according to claim 1, wherein the refractive index of the first thin-film layer is within a range of 1.35 to 1.60 and the refractive index of the second thin-film layer is within a range of 1.50 to 2.50.

3. The transparent substrate with a multilayer antireflection film having electrical conductivity according to claim 1, wherein the second thin-film layer has the refractive index equal to that of the third thin-film layer.

4. The transparent substrate with a multilayer antireflection film having electrical conductivity according to claim 3, wherein a main component of the third thin-film layer is indium tin oxide (ITO).

5. The transparent substrate with a multilayer antireflection film having electrical conductivity according to claim 4, wherein a main component of the second thin-film layer is TiO$_2$.

6. The transparent substrate with a multilayer antireflection film having electrical conductivity according to claim 5, wherein a main component of the first thin-film layer is SiO$_2$.

7. The transparent substrate with a multilayer antireflection film having electrical conductivity according to claim 1, wherein an optical thickness of the first thin-film layer is determined to be approximate λ/4.

8. The transparent substrate with a multilayer antireflection film having electrical conductivity according to claim 1, wherein the third thin-film layer is of a surface resistance value of about 50 Ω/□ or less.

9. A transparent substrate with a multilayer antireflection film having electrical conductivity, the film including a transparent dielectric thin-film and a transparent conductive thin-film layered on the transparent substrate, wherein the transparent dielectric thin-film consists of a first thin-film layer having a lower refractive index than a refractive index of the transparent substrate and a second thin-film layer having a higher refractive index than the refractive index of the transparent substrate, and the transparent conductive thin-film consists of a third thin-film layer having a higher refractive index than the refractive index of the transparent substrate, the first, second, and third thin-film layers being formed on the transparent substrate in this order from the transparent substrate side so that the third thin-film layer is an outermost layer, and an optical thickness of the third thin-film layer is determined to provide a desired surface resistance value, and optical thickness of the second thin-film layer is determined so that the sum total of the optical thickness of the second thin-film layer and the optical thickness of the third thin-film layer is approximate λ/2.

10. The transparent substrate with a multilayer antireflection film having electrical conductivity according to claim 9, wherein the transparent substrate includes a plastic substrate.

11. The transparent substrate with a multilayer antireflection film having electrical conductivity according to claim 10, wherein the refractive index of the first thin-film layer is within a range of 1.35 to 1.58 and the refractive index of the second thin-film layer is within a range of 1.58 to 2.50.

12. The transparent substrate with a multilayer antireflection film having electrical conductivity according to claim 10, wherein the second thin-film layer has the refractive index equal to that of the third thin-film layer.

13. The transparent substrate with a multilayer antireflection film having electrical conductivity according to claim 12, wherein a main component of the third thin-film layer is indium tin oxide (ITO).

14. The transparent substrate with a multilayer antireflection film having electrical conductivity according to claim 13, wherein a main component of the second thin-film layer is $TiO_2$.

15. The transparent substrate with a multilayer antireflection film having electrical conductivity according to claim 14, wherein a main component of the first thin-film layer is $SiO_2$.

16. The transparent substrate with a multilayer antireflection film having electrical conductivity according to claim 9, wherein an optical thickness of the first thin-film layer is determined to be approximate $\lambda/4$.

17. The transparent substrate with a multilayer antireflection film having electrical conductivity according to claim 9, wherein the third thin-film layer is of a thickness within a range of 80 to 200 nm.

18. The transparent substrate with a multilayer antireflection film having electrical conductivity according to claim 9, wherein the third thin-film layer is of a surface resistance value of about 50 $\Omega/\square$ or less.

19. The transparent substrate with a multilayer antireflection film having electrical conductivity according to claim 9, wherein the transparent substrate is previously applied thereto with an undercoat having a thickness causing no optical inhibition.

20. The transparent substrate with a multilayer antireflection film having electrical conductivity according to claim 9, wherein the first, second, and third thin-film layers are formed by one of a vacuum deposition method and a spattering method.

* * * * *